United States Patent [19]
Baumann et al.

[11] Patent Number: 6,005,721
[45] Date of Patent: Dec. 21, 1999

[54] DEVICE FOR OBSERVING A PLURALITY OF FIELDS OF VIEW BY MEANS OF AN IMAGE RESOLVING DETECTOR

[75] Inventors: Rainer Baumann, Überlingen; Hans D. Tholl, Uhldingen; Oliver Giesenberg, Uhldingen-Mühlhofen, all of Germany

[73] Assignee: Bodenseewerk Geratetechnik GmbH, Uberlingen, Germany

[21] Appl. No.: 09/158,604

[22] Filed: Sep. 23, 1998

[30] Foreign Application Priority Data

Sep. 26, 1997 [DE] Germany ............... 197 42 462

[51] Int. Cl.⁶ ............... G02B 27/12; G02B 26/08
[52] U.S. Cl. ............... 359/639; 359/197; 359/209
[58] Field of Search ............... 359/618, 619, 359/621, 622, 639, 640, 196, 197, 209; 362/331, 332

[56] References Cited

U.S. PATENT DOCUMENTS

| | | | |
|---|---|---|---|
| 4,383,170 | 5/1983 | Takagi | 250/216 |
| 5,016,109 | 5/1991 | Gaylord | 358/225 |
| 5,448,395 | 9/1995 | Lopez et al. | 359/224 |

*Primary Examiner*—Georgia Epps
*Assistant Examiner*—David N. Spector
*Attorney, Agent, or Firm*—McDermott, Will & Emery

[57] ABSTRACT

A device for the detection of a continuous field of view or an arrangement of non-contiguous field of view sectors by means of an image resolving detector is provided such that the field of view sectors can be imaged quickly, one after the other, on the total area of the detector. To this end, a first imaging optical system ist provided, in the pupil of which a plurality of pupil areas is formed, each of which images a field of view sector on a common image plane area. A beam deflecting, microoptical beam deflecting element is arranged in the common image plane area. A second imaging optical system is arranged to image the microoptical beam deflecting element on the image resolving detector. The microoptical beam deflecting element is controllable such that it successively deflects beams from different pupil areas on the second imaging optical system.

9 Claims, 3 Drawing Sheets

DEVICE FOR OBSERVING A PLURALITY OF FIELDS OF VIEW BY MEANS OF AN IMAGE RESOLVING DETECTOR

TECHNICAL FIELD

The invention relates to a device for observing a plurality of fields of view by means of an image resolving detector, this device being designed to image the fields of view consecutively on an image resolving detector by an optical system, independently of their spatial arrangement.

BACKGROUND OF THE INVENTION

Such an image resolving detector may be a one-element, linear or matrix detector. With such a detector only a limited number of pixels corresponding to the number of the detector elements can be resolved. That applies in particular to infrared detectors which are provided with relatively few detector elements. If a large field of view is resolved by such a detector it is unavoidable that the spatial resolution suffers. There are applications, however, in which a relatively large field of view must be detected with high spatial resolution in order, for example, to identify a potential target in this field of view by means of image processing or to watch a plurality of non-contiguous field of view sectors.

To solve such problems it is known to divide the field of view into individual field of view sectors which are sequentially imaged on the detector. In a prior art solution this is achieved by suspending the detector together with an imaging optical system in a gimbal system and directing the optical system sequentially to the various field of view sectors. It is also known to deflect the path of rays by rotating diffracting or reflecting polygons or oscillating mirrors, thereby consecutively observing the field of view sectors.

Such an arrangement is expensive. The scanning rate is limited by the mechanics. The detector would permit a substantially higher scanning rate.

U.S. Pat. No. 5,448,395 discloses a device for observing a field of view by means of an image resolving detector, wherein an intermediate image of a field of view detected by the telescopic objective is generated. By means of a plurality of small lenses different portions of the intermediate image representing the various field of view sectors are imaged superimposed on the detector.

SUMMARY OF THE INVENTION

It is an object of the invention to provide a device for the detection of a continuous field of view or an arrangement of non-contiguous field of view sectors by means of an image resolving detector such that the field of view sectors can be imaged quickly, one after the other, on the total area of the detector.

To this end, a first imaging optical system ist provided, in the pupil of which a plurality of pupil areas is formed, each of which images a field of view sector on a common image plane area. A beam deflecting, microoptical beam deflecting element is arranged in the common image plane area. A second imaging optical system is arranged to image the microoptical beam deflecting element on the image resolving detector. The microoptical beam deflecting element is controllable such that it successively deflects beams from different pupil areas on the second imaging optical system.

According to the invention already the first imaging system is divided in the pupil into pupil areas such that it images the different field of view sectors superimposed on the common image plane area. The beam deflecting, microoptical beam deflecting element, for example a micromechanic mirror raster, is located in this image plane area. Such micromechanic mirror rasters are known per se. They consist of a plurality of mirror elements which are arranged essentialy in one plane and which are micromechanically generated. The mirror elements are deflectable by electrical signals. The microoptical beam deflecting element deflects the incident beams on a second imaging optical system, which images the image plane area on an image resolving detector, for example a matrix detector. The deflection of the mirror elements is effected in such way, that, with each position of the mirror elements, only beams from a respective one of the pupil areas of the first imaging optical system are deflected on the second imaging optical system.

This may be best illustrated by regarding a reversal of the path of rays. If the detector is imagined as a light source, then this "light source" would be imaged by the second imaging optical system on the common image plane area. The beams focused there and generating an image of the detector are deflected by the mirror elements of the micromechanical mirror raster in one or the other direction depending on the position of the mirror elements. This is effected in such a way, that the reflected beams pass through one of the pupil areas of the first imaging optical system. In this pupil area the beams are deflected in the respective field of view sector. The detector which has been imagined as a light source would be projected in this field of view sector.

With the control of the microoptical beam deflecting element, it is possible to quickly change between the various pupil areas and, thereby, the individual field of view sectors. Because of the small inertia of the microoptical beam deflecting elements this change can be effected with a frequency which is commensurate with the read out frequency of the matrix detector.

Embodiments of the invention are described below in greater detail with reference to the accompanying drawings.

DESCRIPTION OF PREFERRED EMBODIMENTS

Figure 1:
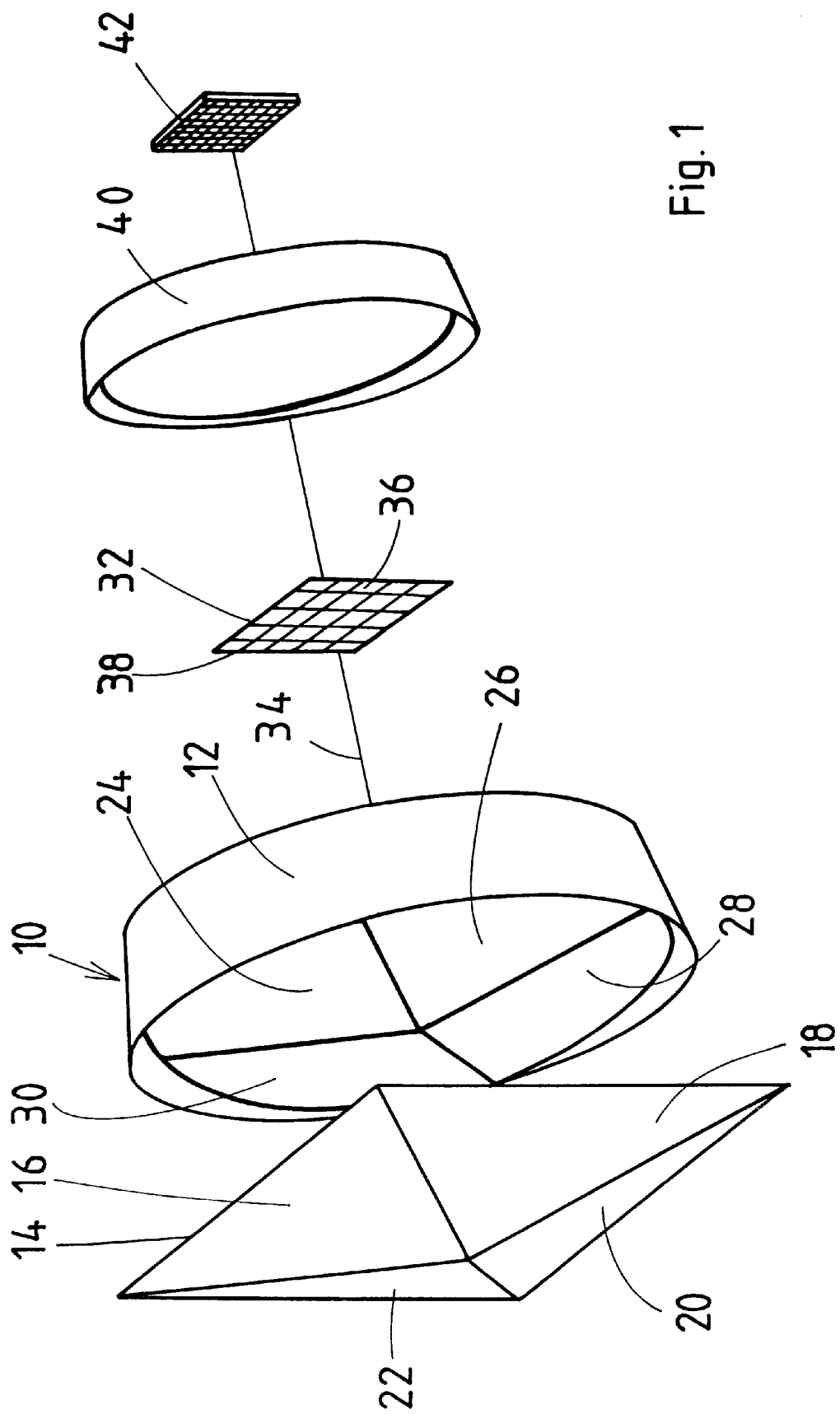
FIG. 1 is a schematic, perspective view of a device for the detection of a continuous field of view or an arrangement of non-contiguous field of view sectors by means of an image resolving detector.

Referring to FIG. 1, numeral 10 denotes a first imaging optical system. The first imaging optical system 10 consists of an objective 12 and an optical system 14 arranged in front of it, the purpose of which is to direct the different field of view sectors in different spatial directions. This beam deflecting optical system 14 can consist of, for example, refractive or reflecting optical elements. In FIG. 1 the beam deflecting optical system is simplified shown as a prism structure. The prism structure 14 is a flat, four-sided pyramid with a square base and four side surfaces 16, 18, 20, 22. The pupil of the objective 12 is divided by this prism structure 14 into four pupil areas 24, 26, 28 and 30. The prism structure is positioned near the entrance pupil of the optical system.

The first imaging optical system 10 images four field of view sectors superimposed on an image plane area 32.

Considering the reversed path of rays: A beam, which originates in the image plane area 32 and passes through the pupil area 24 is deflected by the prism represented by the surface 16 upwards to the left in FIG. 1. The image plane area 32 is therefore backways imaged on a field of view sector to the upper left of the optical axis 34 by the pupil area 24 and the surface 16. In the same manner a beam originating in the image plane area 32 and passing through the pupil area 26 is deflected out of the paperplane in FIG. 1 by the prism represented by the surface 18. The image plane area 32 is therefore backways imaged on a field of view sector reaching out of the paper plane in FIG. 1 by the pupil area 26 and the surface 16. In return all these field of view sectors are imaged superimposed on the image plane area 32.

A beam deflecting microoptical beam deflecting element 36 is arranged in the image plane area 32. This beam deflecting microoptical beam deflecting element can be a micromechanical mirror raster, a micro prism—or micro lens raster or a raster from electrooptical—, acustooptical or liquid cristal elements. Such a raster consists of beam deflecting optical elements 38. The beam deflecting elements 38 can be individually electrically controlled and deflect light beams in different directions. They remain, however, essentially in the image plane.

In FIG. 1 the path of rays is unfolded for better illustration and shown with continuous beams which are deflected by the beam deflecting element 36.

A second imaging optical system 40 in the form of an objective images the image plane area 32 on a matrix detector 42.

The microoptical elements 38 of the beam deflecting element 36 are now controlled such that they consecutively deflect only the beams from the pupil area 24, only the beams from the pupil area 26, only the beams from the pupil area 28 or only the beams from the pupil area 30 on the second imaging optical system. The beams from the different pupil areas fall onto the image plane area 32 from different directions and therefore on the microoptical beam deflecting element 36.

Therefore the different field of view sectors are consecutively detected by the detector 42 with high resolution. From the successively occurring signals of the detector 42 an image of a larger field of view can be "electronically assembled" if necessary.

Figure 2:
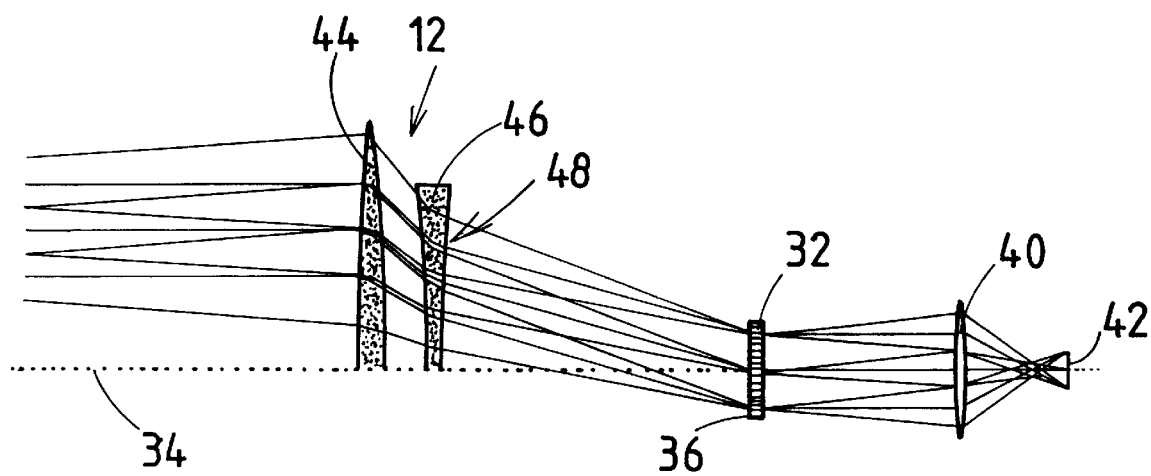
FIG. 2 shows the unfolded path of rays for one field of view sector.

FIG. 2 shows an unfolded path of rays for one field of view sector. The objective 12 consists of a biconvex lens 44 and a biconcave lens 46. The field of view sector is imaged through a pupil area 48 which is arranged above the optical axis 34 on the image plane area 32 with the microoptical beam deflecting element 36. The microoptical beam deflecting element 36 deflects the beams from the pupil area 48—and only these—on the second imaging optical system 40 in the form of a lens. The second imaging optical system images the microoptical beam deflecting element on the detector 42.

Figure 3:
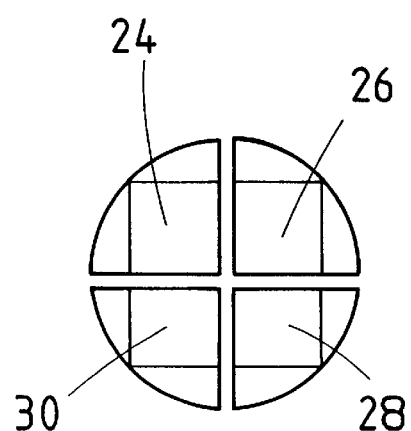
FIG. 3 illustrates the division of the pupil into pupil areas of the arrangements of FIG. 1 and FIG. 2.

FIG. 3 shows the pupil of the objective 12 with the pupil areas 24, 26, 28 and 30 which are defined by the prism structure 14. The prism structure 14 is positioned near the entrance pupil of the system.

Figure 4:
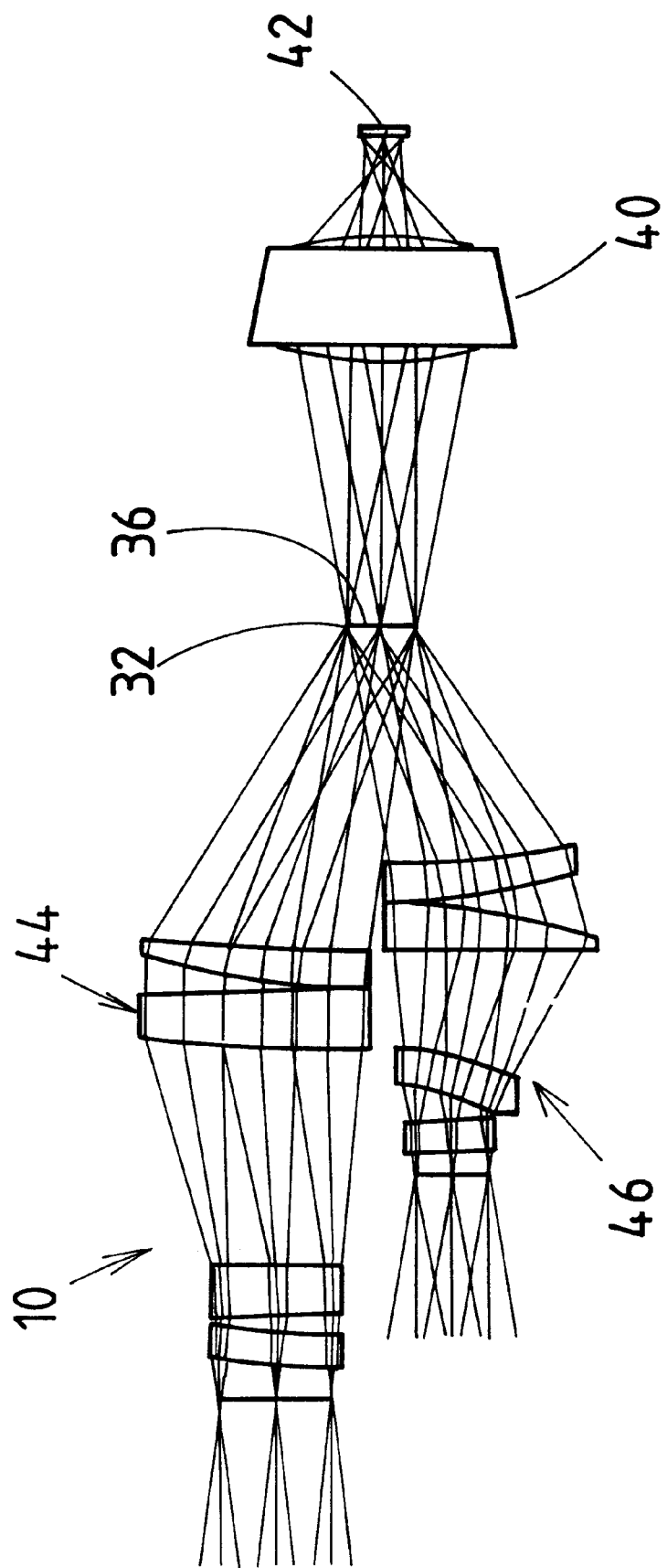
FIG. 4 shows the unfolded path of rays for two partial fields of view in a different embodiment of the device for the detection of a plurality of field of view sectors by means of an image resolving detector.

FIG. 4 shows a different embodiment of a device for the detection of—if required—a plurality of field of view sectors by means of an image resolving detector. In the embodiment according to FIG. 4 the pupil areas in the first imaging optical system are formed by sectors, in which different sector shaped lens systems 44 and 46 are arranged. In the embodiment of FIG. 4 the sector shaped lens systems 44 and 46 have different focal lengths. The lens system 44 has a relatively large focal length. It detects a relatively small solid angle with a relatively high resolution. The lens system 46 has a short focal length relativ to the lens system 44 and detects a larger solid angle. The lens systems 44 and 46 can be allocated to different field of view sectors by, for example, a prism structure similar to the one in FIG. 1. The two lens systems 44 and 46 can, however, also detect concentric field of view sectors, the field of view sector detected by the lens system 44 with a larger focal length lying within the field of view sector detected by the lens system 46 with a shorter focal length. It is important, that both lens systems 44 and 46 generate an image on the image plane area with the microoptical beam deflecting element 36.

We claim:

1. A a device for observing a plurality of fields of view, comprising: an image resolving detector; a first imaging optical system having a pupil, means for defining a plurality of pupil areas within said pupil, each of said pupil areas being adapted to image an associated one of said fields of view onto a common image plane area; a microoptical beam deflecting element arranged in said common image plane area; a second imaging optical system arranged to image said microoptical beam deflecting element on said image resolving detector; and means for actuating said microoptical beam deflecting element to consecutively direct radiation from the various pupil areas to said second imaging optical system.

2. A device as claimed in claim 1, wherein said first imaging optical system comprises imaging means and additional beam deflecting optical elements, each of said additional beam deflecting optical elements being associated with one of said pupil areas to deflect beams passing therethrough.

3. A device as claimed in claim 2, wherein said imaging means comprise a lens system.

4. A device as claimed in claim 2, wherein said imaging means comprise a mirror system.

5. A device as claimed in claim 2, wherein said imaging means comprise a combination of a lens system and a mirror system.

6. A device as claimed in claim 2, wherein said beam deflecting optical elements are integrated in said imaging means.

7. A device as claimed in claim 1, wherein said microoptical beam deflecting element is one of the group of: a micro-mechanical mirror raster, a raster of microoptical prism systems and a raster of microoptical lens systems.

8. A device as claimed in claim 1, wherein said first imaging optical system comprises a plurality of sector-shaped lens systems having different focal lengths.

9. A device as claimed in claim 2, wherein said beam deflecting optical elements form a pyramid.

\* \* \* \* \*